(12) United States Patent
Takeuchi (10) Patent No.: US 7,748,292 B2
(45) Date of Patent: Jul. 6, 2010

(54) BEARING SYSTEM AND BALANCER (75) Inventor: Yoshihiko Takeuchi, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 1089 days.

(21) Appl. No.: 11/331,822

(22) Filed: Jan. 13, 2006

(65) Prior Publication Data

US 2007/0012278 A1    Jan. 18, 2007

(30) Foreign Application Priority Data

Feb. 4, 2005    (JP) .............................. 2005-029355

(51) Int. Cl.
*F16C 3/04* (2006.01)
*F16C 11/00* (2006.01)
*F16C 33/10* (2006.01)
*F02B 75/06* (2006.01)
*F16N 1/00* (2006.01)

(52) U.S. Cl. .............................. 74/595; 74/596; 74/603; 123/192.2; 384/289; 384/398; 29/888.04

(58) Field of Classification Search .............. 123/192.2, 123/196 R; 384/289, 398; 74/595–598, 74/603–605
See application file for complete search history.

(56) References Cited

U.S. PATENT DOCUMENTS

| | | | | |
|---|---|---|---|---|
| 5,038,731 A | * | 8/1991 | Shimada | .................. 123/192.2 |
| 6,055,726 A | * | 5/2000 | Ito et al. | .................. 29/888.04 |
| 6,076,624 A | * | 6/2000 | Izumi et al. | .................. 180/291 |
| 6,964,253 B2 | * | 11/2005 | Takeuchi | .................. 123/192.2 |
| 6,990,942 B2 | * | 1/2006 | Takeuchi | .................. 123/192.2 |

FOREIGN PATENT DOCUMENTS

JP    50-032641    9/1975

OTHER PUBLICATIONS

PTO 10-0429, Translation of DE 50-32641, Susumi Shimamoto, Sep. 23, 1975.*

* cited by examiner

*Primary Examiner*—Vinh T. Luong
(74) *Attorney, Agent, or Firm*—Rabin & Berdo, PC (57) ABSTRACT

A bearing system can reduce the relative velocity between a bearing member and a rotation shaft and a rotating member to decrease a load on the bearing member although the rotation shaft and the rotating member rotate in opposite directions with the bearing member therebetween. The bearing system includes a case and a rotation shaft supported by the case. A rotating member is disposed coaxially outside the rotation shaft and rotates in the direction opposite to that of the rotation shaft. A housing is interposed between the rotation shaft and the rotating member and is fixed to the case. A bearing member that rotatably supports the rotating member is interposed between the housing and the rotating member.

12 Claims, 9 Drawing Sheets

BEARING SYSTEM AND BALANCER

BACKGROUND OF THE INVENTION

1. Field of the Invention

The present invention relates to a bearing system and balancer.

2. Description of Related Art

Conventional engines for vehicles, such as motorcycle engines, have a balancer for reducing the vibration of the engines housed in the crankcase.

In general, the balancer is used to cancel an inertial force generated by a reciprocating component represented by a piston and a con'rod. The balancer has a balance weight that rotates in the direction opposite to that of the crankshaft at the same speed. The balance weight is disposed coaxially on the shaft of the crankshaft or on a shaft different from the crankshaft. In either case, the balance weight is driven by the power transmitted from the crankshaft.

The balance weight disposed coaxially with the crankshaft has a boss through which the shaft of the crankshaft passes. The boss is supported rotatably around the outer circumference of the shaft via a slide bearing. The slide bearing is press-fitted in a bearing hole opened in the boss. The shaft of the crankshaft is fitted in the slide bearing with clearance therebetween. The slide bearing is supported floatingly by the crankshaft and is rotated with the balance weight.

Referring to Japanese Patent Document JP-UM-B-50-32641, the slide bearing that supports the balance weight rotates in the direction opposite to that of the crankshaft. The reverse rotation doubles the relative velocity generated between the crankshaft and the slide bearing at the maximum, which increases the load on the slide bearing. This poses disadvantages of decreasing the life of the slide bearing and generating extraordinary wear, which may cause seizing, in the slide bearing.

SUMMARY OF THE INVENTION

The present invention relates to a bearing system for coaxially supporting a rotating member on a rotating shaft that rotates in one direction. The rotating member rotates in a direction opposite to that of the rotating shaft.

The present invention relates to a balancer having a balance weight on the shaft of a crankshaft. The balance weight rotates in the direction opposite to that of the crankshaft.

The present invention relates to a structure that reduces a load to a bearing member interposed between the balance weight and the shaft.

Accordingly, it is an object of the invention to provide a bearing system that can reduce the relative velocity between a bearing member and a rotation shaft and a rotating member to decrease a load on the bearing member although the rotation shaft and the rotating member rotate in opposite directions with the bearing member therebetween.

It is another object of the invention to provide a balancer that can reduce the relative velocity between the bearing member and a crankshaft and a balance weight to decrease the load on the bearing member although the crankshaft and the balance weight rotate in opposite directions with the bearing member therebetween.

To achieve the above object, a bearing system according to an aspect of the invention includes a case and a rotation shaft supported by the case. A rotating member is disposed coaxially outside the rotation shaft and rotating in the direction opposite to that of the rotation shaft. A housing is fixed to the case and interposed between the rotation shaft and the rotating member. A bearing member is interposed between the housing and the rotating member and rotatably supports the rotating member.

To achieve the above object, a balancer according to an aspect of the invention includes a crankcase and a crankshaft supported by the crankcase and having a shaft. A balance weight includes a boss through which the shaft passes coaxially and rotating in the direction opposite to that of the crankshaft. A housing is fixed to the crankcase and interposed between the shaft of the crankshaft and the boss of the balance weight. A bearing member is interposed between the housing and the boss and supports the boss rotatably.

According to an aspect of the present invention, the velocity of a bearing member relative to a component rotating in the opposite direction can be decreased because the bearing member is separated from the component. Therefore, the load on the bearing member can be reduced so that the life of the bearing member can be increased and the occurrence of extraordinary wear that may cause seizing or the like can be prevented.

DETAILED DESCRIPTION OF THE INVENTION

A first embodiment of the invention will be described below with reference to FIGS. 1 to 6.

Figure 1:
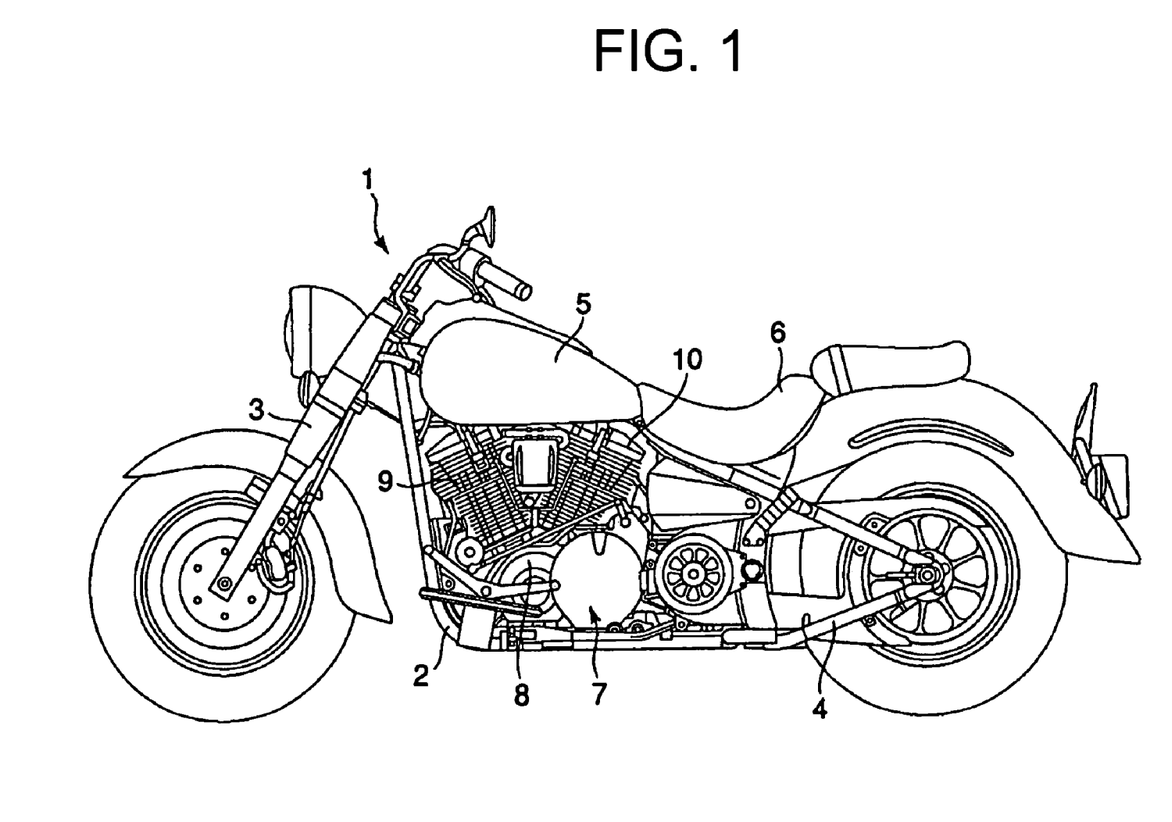
FIG. 1 is a side view of a motorcycle according to a first embodiment of the invention.

FIG. 1 discloses a vehicle, such as a motorcycle 1, according to one embodiment of the present invention. The motorcycle 1 includes a frame 2 shaped like a cradle. The frame 2 supports a front fork 3, a rear swing arm 4, a fuel tank 5, and a seat 6.

The frame 2 supports, for example, an air-cooled four-cycle V-2 engine 7. The engine 7 is disposed behind the front fork 3 and below the fuel tank 5.

Figure 3:
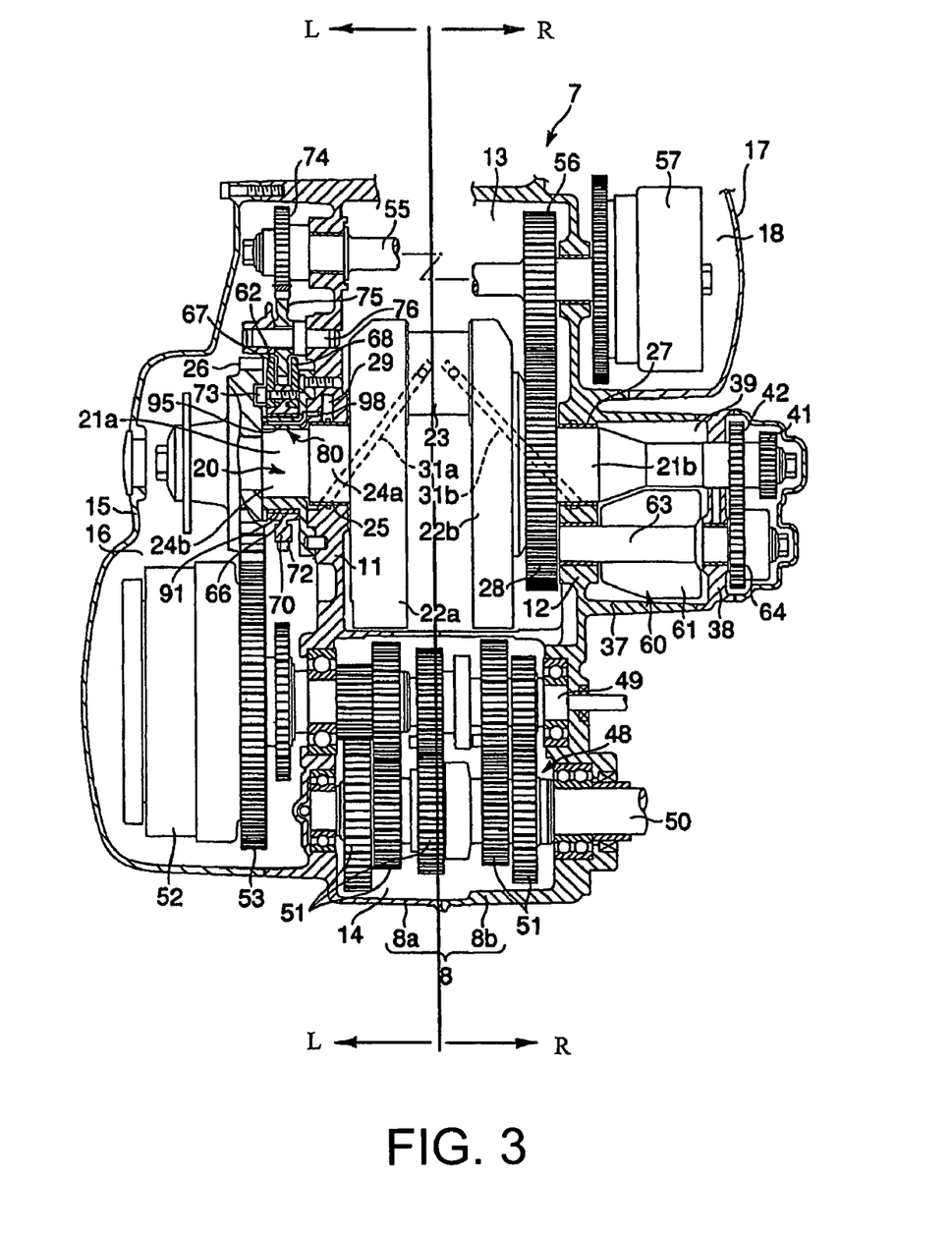
FIG. 3 is a cross-sectional view of the air-cooled four-cycle V-2 engine according to the first embodiment of the invention and shows the positional relationship among the crankshaft, the balancer, and a gear transmission.

The engine 7 includes a crankcase 8, a front cylinder 9, and a rear cylinder 10. As shown in FIG. 3, the crankcase 8 is divided into a left case 8a and a right case 8b. The left case 8a has a support wall 11. The right case 8b has a support wall 12. The support walls 11 and 12 extend along the length of the crankcase 8 and are opposed to each other along the width of the crankcase 8 with a space therebetween. Between the left case 8a and the right case 8b, a crank chamber 13 and a transmission chamber 14 are provided. The transmission chamber 14 is located behind the crank chamber 13.

The outer side of the left case 8a is covered by a clutch cover 15. The clutch cover 15 forms a clutch chamber 16 between it and the left case 8a. The outer side of the right case 8b is covered by a generator cover 17. The generator cover 17 forms a generator chamber 18 between it and the right case 8b. The generator chamber 18 is located at the front end of the crankcase 8.

The crankcase 8 houses a crankshaft 20. The crankshaft 20 is an example of a rotation shaft, which is disposed horizontally along the width of the motorcycle 1. The crankshaft 20 includes a pair of shafts 21a and 21b, a pair of crank webs 22a and 22b, and a crank pin 23. The shaft 21a is located at the left end of the crankshaft 20. The shaft 21b is located at the right end of the crankshaft 20. The shaft 21a, which is located at the left end of the crankshaft 20, has a first portion 24a and a second portion 24b. The first and second portions 24a and 24b are disposed coaxially along the axis of the crankshaft 20.

The first portion 24a of the shaft 21a is rotatably supported by the support wall 11 of the left case 8a via a slide bearing 25. The second portion 24b of the shaft 21a and the part of the shaft 21a adjacent to the end relative to the second portion 24b are introduced into the clutch chamber 16. A reduction pinion 26 is fixed to the end of the shaft 21a.

The shaft 21b, which is disposed at the right end of the crankshaft 20, is rotatably supported by the support wall 12 of the right case 8b via the slide bearing 27. The crank webs 22a and 22b of the crankshaft 20 and the crank pin 23 are housed in the crank chamber 13 between the support walls 11 and 12. A driving gear 28 is fixed on the shaft 21b of the crankshaft 20. The driving gear 28 is interposed between the crank web 22b on the left and the support wall 12 and in the crank chamber 13.

Figure 4:
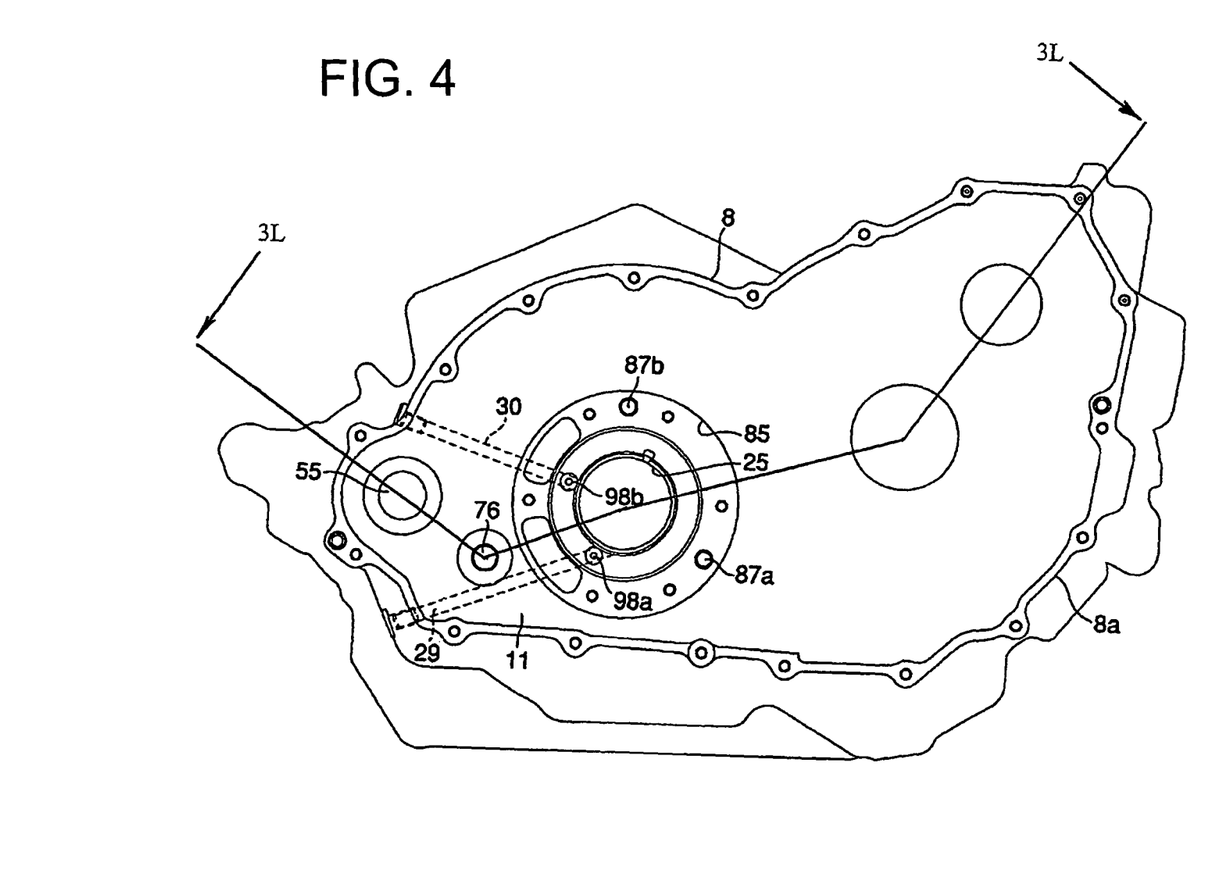
FIG. 4 is a side view of the left case of a crankcase according to the first embodiment of the invention.

As shown in FIG. 4, the support wall 11 of the crankcase 8 has a feed passage 29 and a return passage 30 communicating with an oil pump (not shown). Lubricating oil fed from the oil pump is supplied via the feed passage 29 to the slide bearing 25. Part of the lubricating oil that has lubricated the slide bearing 25 is introduced from the slide bearing 25 into the crank pin 23 via a delivery passage 31a formed in the crankshaft 20. The remainder of the lubricating oil that has lubricated the slide bearing 25 is introduced to the other lubrication part of the engine 7 through the return passage 30.

Similarly, the support wall 12 of the crankcase 8 has a feed passage (not shown) for supplying lubricating oil to the slide bearing 27. The lubricating oil that has lubricated the slide bearing 27 is introduced to the crank pin 23 through another delivery passage 31b formed in the crankshaft 20.

Figure 2:
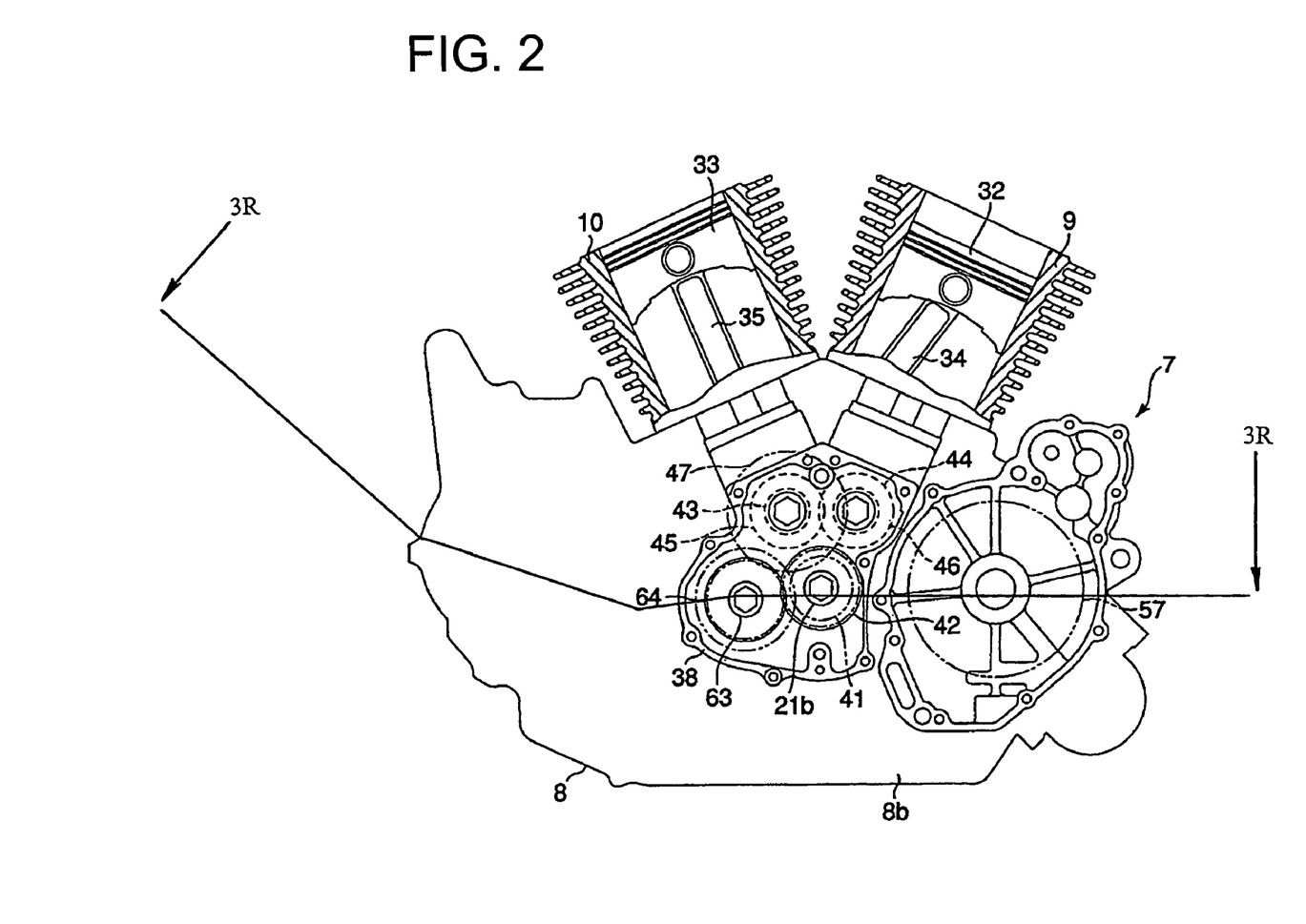
FIG. 2 is a side view of an air-cooled four-cycle V-2 engine according to the first embodiment of the invention and shows the positional relationship among a crankshaft, a cam shaft, and a balancer shaft.

As shown in FIG. 2, the front cylinder 9 of the engine 7 houses a piston 32, and the rear cylinder 10 houses a piston 33. The pistons 32 and 33 connect to the crank pin 23 of the crankshaft 20 via con'rods 34 and 35, respectively. In this embodiment, the piston 32 of the front cylinder 9 and the piston 33 of the rear cylinder 10 reciprocate substantially at the same timing, and as such, the crankshaft 20 rotates in one direction.

As shown in FIG. 3, the shaft 21b of the crankshaft 20 projects outward from the support wall 12 of the right case 8b. The right case 8b has a cylindrical part 37 that encloses the shaft 21b. The projecting end of the cylindrical part 37 is covered by a case cover 38. The case cover 38 and the cylindrical part 37 cooperate in defining a cam chamber 39.

The shaft 21b projects externally from the cam chamber 39 through the case cover 38. A cam driving gear 41 and a balancer driving gear 42 are fixed coaxially on the projecting end of the shaft 21b.

As shown in FIG. 2, two cam shafts 43 and 44 are housed in the cam chamber 39 of the right case 8b. The cam shafts 43 and 44 are disposed in the front and rear of the crankcase 8 in parallel with the crankshaft 20. The rear cam shaft 43 includes a valve driving gear that drives the intake valve and the exhaust valve of the rear cylinder 10. The front cam shaft 44 includes a valve driving cam that drives the intake valve and the exhaust valve of the front cylinder 9.

Intermediate gears 45 and 46 are fixed to the ends of the cam shafts 43 and 44, respectively. The intermediate gears 45 and 46 are in engagement with each other to thereby rotate the two cam shafts 43 and 44 synchronously. The rear cam shaft 43 includes a timing gear 47. The timing gear 47 is in engagement with the cam driving gear 41 that rotates integrally with the crankshaft 20. The cam shafts 43 and 44 rotate by the power transmitted from the crankshaft 20.

As shown in FIG. 3, a gear transmission 48 is housed in the transmission chamber 14 of the crankcase 8. The gear transmission 48 includes first and second change gear shafts 49 and 50 and a plurality of change gear trains 51 mounted on the change gear shafts 49 and 50. The first and second change gear shafts 49 and 50 extend between the left case 8a and the right case 8b and in parallel with the crankshaft 20.

A friction clutch 52 is fixed to one end of the first change gear shaft 49. The friction clutch 52 transmits or interrupts the torque of the crankshaft 20 to the gear transmission 48 and is housed in the clutch chamber 16. The friction clutch 52 includes a reduction gear wheel 53. The reduction gear wheel 53 is in engagement with the reduction pinion 26 on the crankshaft 20. This engagement allows transmission of torque of the crankshaft 20 to the gear transmission 48 via the friction clutch 52.

A relay shaft 55 is disposed at the front end of the crank chamber 13. The relay shaft 55 extends between the left case 8a and the right case 8b and in parallel with the crankshaft 20. A driven gear 56 is fixed on the relay shaft 55. The driven gear 56 is in engagement with the driving gear 28 that rotates with the crankshaft 20. Thus, the relay shaft 55 rotates at a rotation speed as twice as that of the crankshaft 20 in the opposite direction.

A generator 57 is fixed to one end of the relay shaft 55. The generator 57 is housed in the generator chamber 18.

As shown in FIG. 3, the engine 7 includes a balancer 60 for reducing the vibration of the engine 7. In one aspect, the balancer 60 is used to cancel the primary component of the inertial force generated by the reciprocating components, such as the pistons 32 and 33 and the con'rods 34 and 35 and includes a first balance weight 61 and a second balance weight 62.

The first balance weight 61 is disposed on a dedicated balancer shaft 63. The balancer shaft 63 extends between the support wall 12 of the right case 8b and the case cover 38. The balancer shaft 63 is located in parallel with the shaft 21b of the crankshaft 20 and at the rear of the shaft 21b.

The end of the balancer shaft 63 projects outward from the cam chamber 39 through the case cover 38. A driven gear 64 is fixed to the end of the balancer shaft 63. The driven gear 64 is in engagement with the balancer driving gear 42 that rotates with the crankshaft 20. This engagement allows the balancer shaft 63 and the first balance weight 61 to rotate at the same speed as that of the crankshaft 20 in the opposite direction thereto.

The second balance weight 62 is an example of a rotating member, which is held coaxially around the shaft 21a of the crankshaft 20. The second balance weight 62 is located on the outer circumference of the second portion 24b of the shaft 21a and between the support wall 11 of the left case 8a and the reduction pinion 26. The second balance weight 62 is housed in the clutch chamber 16.

Figure 6:
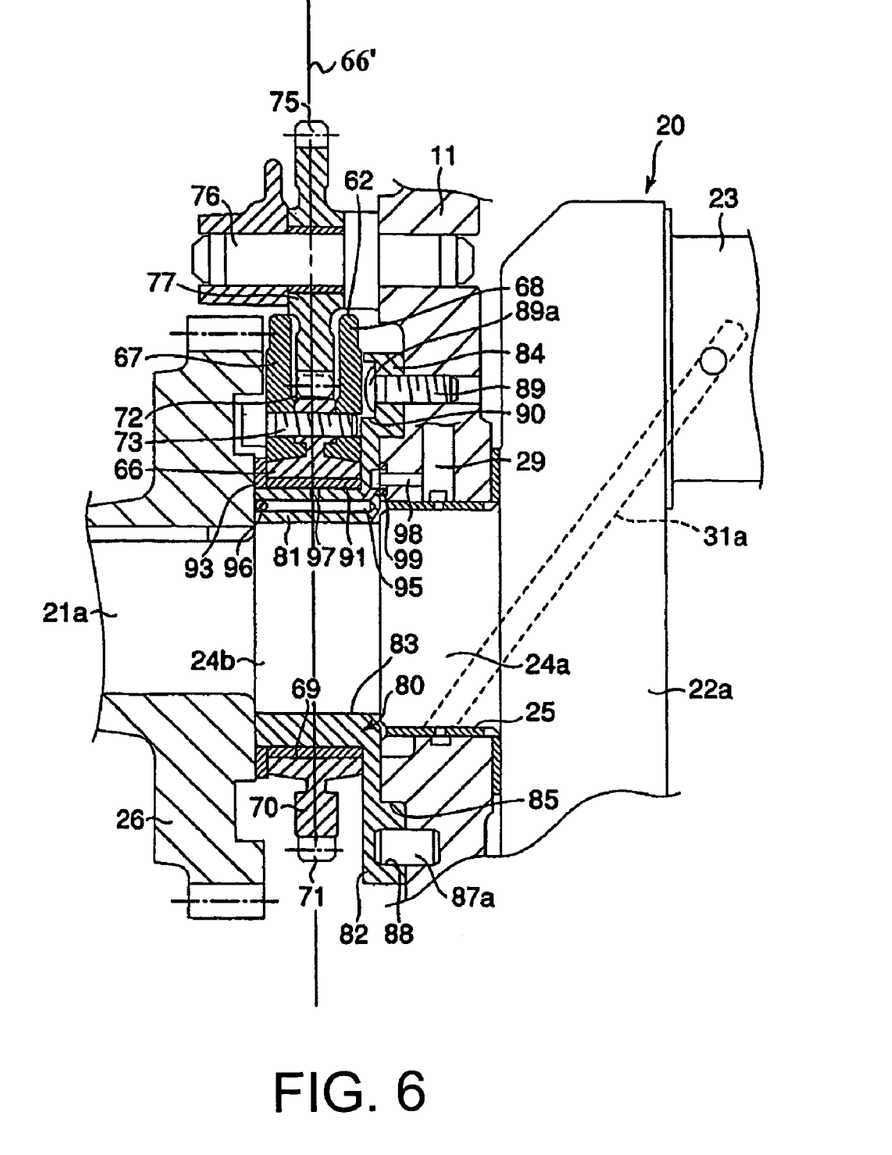
FIG. 6 is a cross-sectional view showing the positional relationship among the second balance weight, the boss of the housing, the slide bearing, and the crankshaft, and the lubricating-oil route to the slide bearing according to the first embodiment of the invention.

As shown in FIG. 6, the second balance weight 62 includes a boss 66 and first and second weights 67 and 68. The boss 66 and the first weight 67 are separate from each other. The boss 66 and the second weight 68 are separate from each other.

The boss 66 is in a cylindrical shape having a bearing hole 69 through which the shaft 21a passes coaxially. A disc-shaped flange 70 is provided around the outer circumference of the boss 66. The flange 70 extends coaxially from the axial center 66' of the boss 66 radially outward. A plurality of teeth 71 is formed around the outer periphery of the flange 70. In other words, the flange 70 has a balancer driving gear 72 on the boss 66. The balancer driving gear 72 is smaller in diameter than the reduction pinion 26 and is integrated with the second balance weight 62.

Figure 5:
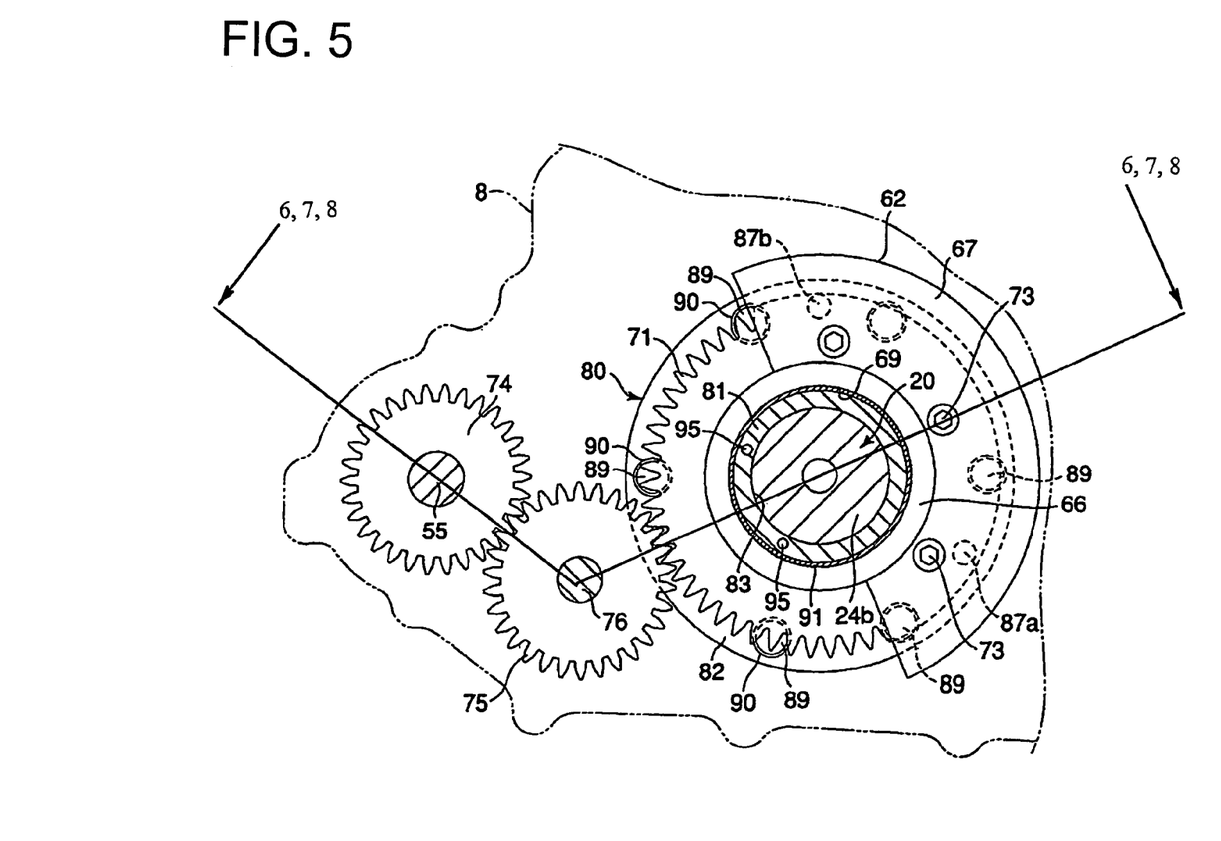
FIG. 5 is a side view showing the positional relationship among a second balance weight, the boss of a housing, a slide bearing, and the crankshaft according to the first embodiment of the invention.

As shown in FIG. 5, the first and second weights 67 and 68 are arc-shaped plates. The first weight 67 and the second weight 68 are opposed to each other with the flange 70 therebetween and are fixed to the flange 70 with multiple bolts 73. The first and second weights 67 and 68 are thus disposed in symmetry with the axial center 66' of the boss 66 therebetween (FIG. 6). The first and second weights 67 and 68 extend radially outward with respect to the balancer driving gear 72.

The second balance weight 62 rotates by the torque from the relay shaft 55. The transfer route of the torque will be described. As shown in FIG. 3, a second end of the relay shaft 55 passes through the support wall 11 of the left case 8a into the clutch chamber 16. A driving gear 74 is fixed to the second end of the relay shaft 55.

An idle gear 75 is interposed between the driving gear 74 and the balancer driving gear 72. The idle gear 75 is supported by the support wall 11 via an axis 76 and is in engagement with the driving gear 74 and the balancer driving gear 72. The engagement leads to a decrease in the number of rotation of the relay shaft 55 to half and allows transmission of the torque of the relay shaft 55 to the second balance weight 62 integrated with the balancer driving gear 72. As a result, the second balance weight 62 rotates at the same speed as that of the crankshaft 20 in the opposite direction thereto.

As shown in FIG. 6, the axis 76 passes through the boss 77 in the center of the rotation of the idle gear 75. The first and second weights 67 and 68 of the second balance weight 62 each have an arc-shaped outer periphery. The outer peripheries of the first and second weights 67 and 68 are adjacent to the outer circumference of the boss 77. The engaged portion of the idle gear 75 and the balancer driving gear 72 are between the first weight 67 and the second weight 68.

As shown in FIG. 6, a housing 80 is fixed to the support wall 11 of the left case 8a. The housing 80 is made of, for example, a high-rigidity metal material such as chromium molybdenum steel. The housing 80 includes a boss 81 and a flange 82. The boss 81 is in the shape of a hollow cylinder having a through hole 83 through which the second portion 24b of the shaft 21b passes and is interposed between the second portion 24b of the shaft 21b and the boss 66 of the second balance weight 62.

The flange 82 is shaped like a disc extending from the outer circumference of the boss 81 outward radially and is coaxial with the boss 81. The diameter of the flange 82 is larger than that of the balancer driving gear 72 and smaller than that of the reduction pinion 26.

The flange 82 has a projection 84 projecting from the outer periphery to the support wall 11. The projection 84 continues along the circumference of the flange 82 and is fitted in the recess 85 of the support wall 11. Thus the housing 80 is aligned with the support wall 11. The presence of the projection 84 makes the thickness of the outer periphery of the flange 82 the maximum of the flange 82.

The recess 85 of the support wall 11 encloses the first portion 24a of the shaft 21a in a radially separate position. Therefore, the part of the support wall 11 where the shaft 21a passes through is sufficiently thick, thus increasing the rigidity of the bearing part that supports the crankshaft 20.

As shown in FIGS. 4 and 6, a pair of knock pins 87a and 87b is fixed to the bottom of the recess 85 of the support wall 11. The knock pins 87a and 87b deviate from each other along the circumference of the shaft 21a and project to the flange 82. The flange 82 has a pair of fitting holes 88 (only one is shown) in which the knock pins 87a and 87b are tightly fitted.

With the knock pins 87a and 87b fitted in the fitting holes 88, the axes of the shaft 21a of the crankshaft 20 and the boss 81 of the housing 80 can be agreed with high accuracy. Accordingly, a circumferentially continuous even clearance is formed between the outer circumference of the second portion 24b of the shaft 21a, and the inner circumference of the through hole 83 of the boss 81.

Accordingly, in this embodiment, the knock pins 87a and 87b and the fitting holes 88 serve as positioning means.

As shown in FIGS. 5 and 6, the outer periphery of the flange 82 is fixed to the support wall 11 with multiple bolts 89. The bolt 89 is an example of a fastening member and has a large-diameter head 89a. The bolts 89 are screwed into the support wall 11 through the projection 84 of the flange 82. Thus, the housing 80 is fixed to the support wall 11 with the boss 81 and the shaft 21a disposed coaxially with each other.

A plurality of depressions 90 are formed around the outer periphery of the flange 82. The depressions 90 are for use in housing the heads 89a of the bolts 89 and are disposed at intervals along the circumference of the flange 82. The depressions 90 are open only in the direction of the second balance weight 62. Therefore, the outer periphery of the flange 82 continues circumferentially without a decrease in thickness so that the flange 82 may hardly be deformed even when the bolts 89 are tightened.

As shown in FIGS. 5 and 6, the second balance weight 62 is rotatably supported on the boss 81 of the housing 80 via a slide bearing 91. The slide bearing 91 is an example of a bearing member, which is interposed between the boss 66 of the second balance weight 62 and the boss 81 of the housing 80.

Specifically, the slide bearing 91 is press fitted into the bearing hole 69 of the boss 66 and is rotated with the second balance weight 62. Furthermore, the slide bearing 91 is fitted in the boss 81 of the housing 80 with clearance into slide contact with the outer circumference of the boss 81. In other words, the boss 81 of the housing 80 separates the slide bearing 91 from the crankshaft 20 that rotates in the direction opposite to that of the second balance weight 62.

As shown in FIG. 6, a washer 93 is interposed between the boss 66 of the second balance weight 62 and the reduction pinion 26. The washer 93 is interposed between the reduction pinion 26 and the boss 66 when the reduction pinion 26 is fixed to the shaft 21a of the crankshaft 20 to hold the boss 66 between it and the flange 82 of the housing 80. Thus, the second balance weight 62 can be aligned axially to the crankshaft 20, and the clearance between the reduction pinion 26 and the second balance weight 62 can be controlled.

As shown in FIGS. 5 and 6, a pair of oil passages 95 are provided in the boss 81 of the housing 80. The oil passages 95 extend along the axis of the boss 81. One end of the oil passage 95 is closed by a stopper 96, and the other end is open to the end face of the flange 82 facing the support wall 11. The boss 81 has a filler port 97. The filler port 97 communicates with the oil passage 95 and is open to the outer circumference of the boss 81.

As shown in FIG. 4, the support wall 11 has first and second oil ports 98a and 98b. The first oil port 98a connects the downstream end of the feed passage 29 and one oil passage 95. The second oil port 98b connects the upstream end of the return passage 30 and the other oil passage 95. Accordingly, part of the lubricating oil that lubricates the bearing portion of the crankshaft 20 flows through the first and second oil ports 98a and 98b into the oil passages 95, from which it is supplied through the filler port 97 into the clearance between the slide bearing 91 and the boss 81. As a result, an oil film is formed between the slide bearing 91 and the boss 81, so that the slide bearing 91 is supported floatingly relative to the boss 81.

A sealing member 99, such as an O-ring, is sandwiched between the support wall 11 and the flange 82 of the housing 80. The sealing member 99 is combined with the support wall 11 and encloses the part that communicates the first and second oil ports 98a and 98b with the oil passages 95.

According to the first embodiment of the present invention, the boss 81 of the housing 80 is interposed between the shaft 21a of the crankshaft 20 and the boss 66 of the second balance weight 62, and the housing 80 is fixed to the support wall 11 of the crankcase 8. The slide bearing 91, that is press-fitted into the boss 66 of the second balance weight 62, is fitted in the boss 81 of the housing 80 with clearance therebetween.

Accordingly, the slide bearing 91 can be separated from the crankshaft 20 by the housing 80 even though the slide bearing 91 rotates in the direction opposite to that of the crankshaft 20, thus decreasing the relative velocity between the slide bearing 91 and the crankshaft 20. This reduces the load on the slide bearing 91 to increase the life of the slide bearing 91 and prevents extraordinary wear that can cause seizing. Thus the reliability of the bearing portion that supports the second balance weight 62 is improved.

With such a structure, the second balance weight 62 includes the boss 66 into which the slide bearing 91 is press-fitted and the first and second weights 67 and 68 fixed to the flange 70 of the boss 66. The first and second weights 67 and 68 are disposed in symmetry while sandwiching the axial center 66' of the boss 66.

The weight of the first and second weights 67 and 68 is distributed across the entire length of the boss 66, thereby preventing an offset load on the slide bearing 91 that supports the boss 66. This prevents local wear of the slide bearing 91, thereby increasing the life of the slide bearing 91.

In addition, since the housing 80 supports the rotating second balance weight 62, the flange 82 of the housing 80 fixed to the support wall 11 undergoes the inertial force of the second balance weight 62. With the above-described structure, the outer periphery of the flange 82 fixed to the support wall 11 with the bolts 89 is largest in thickness of the flange 82 and continues circumferentially without decreasing the thickness.

As a result, the outer periphery of the flange 82 is provided with high rigidity and has sufficient resistance to the inertial force of the second balance weight 62. This offers the advantages of easily agreeing the axes of the shaft 21a of the crankshaft 20 and the second balance weight 62 to each other.

It should be understood that the present invention is not limited to the first embodiment.

Figure 7:
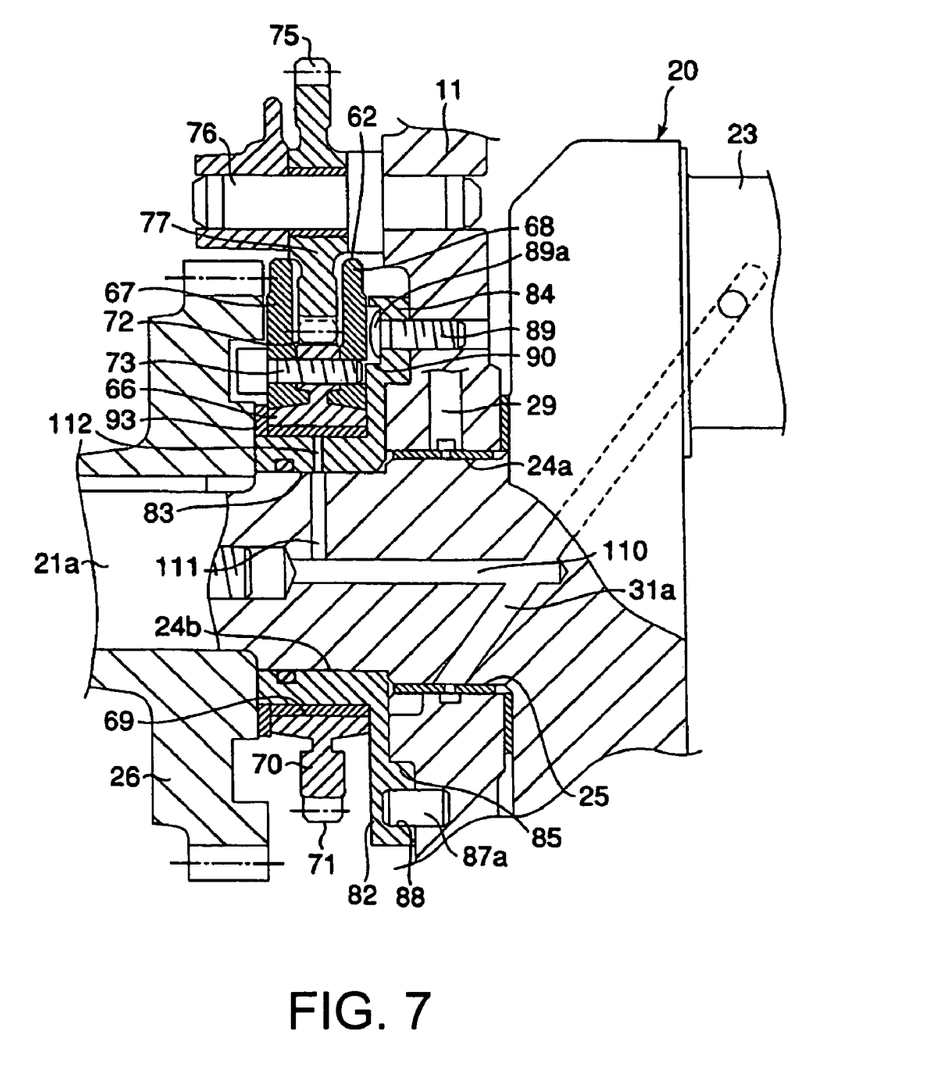
FIG. 7 is a cross-sectional view showing the positional relationship among the second balance weight, the boss of the housing, the slide bearing, and the crankshaft, and the lubricating-oil route to the slide bearing according to a second embodiment of the invention.

FIG. 7 discloses a second embodiment of the invention. The difference between the second embodiment and the first embodiment is the structure for supplying lubricating oil to the clearance between the boss 81 of the housing 80 and the slide bearing 91. The other structure is the same as that of the first embodiment. Accordingly, the components of the second embodiment the same as those of the first components are given the same reference numerals and their description will be omitted.

As shown in FIG. 7, a feed passage 110 is provided in the shaft 21a of the crankshaft 20. The feed passage 110 branches from the delivery passage 31a in the crankshaft 20 and extends along the axis of the shaft 21a. Furthermore, an oil passage 111 is provided in the shaft 21a. The oil passage 111 extends along the radius of the shaft 21a so as to cross the feed passage 110 at right angles. One end of the oil passage 111 continues to the feed passage 110, and the other end of the oil passage 111 is open to the outer circumference of the second portion 24b of the shaft 21a.

An oil port 112 is provided in the boss 81 of the housing 80. The oil port 112 extends along the radius of the boss 81. A first end of the oil port 112 is open to the through hole 83 of the boss 81. A second end of the oil port 112 is open to the outer circumference of the boss 81. The first end of the oil port 112 is located on the locus of rotation of the second end of the oil passage 111 when the crankshaft 20 rotates.

With such a structure, the lubricating oil, that has lubricated the bearing portion of the crankshaft 20, flows from the delivery passage 31a into the feed passage 110. The lubricating oil is then supplied to the clearance between the slide bearing 91 and the boss 81 through the oil port 112 every time the oil passage 111 and the oil port 112 agree with each other at the rotation of the crankshaft 20. As a result, an oil film is formed between the slide bearing 91 and the boss 81, so that the slide bearing 91 is supported floatingly relative to the boss 81.

According to the second embodiment of the invention, lubricating oil can be supplied from the crankshaft 20 to the slide bearing 91. Therefore, there is no need to have a complicated passage in the housing 80 or the support wall 11 for distributing the lubricating oil flowing in the feed passage 29 to the slide bearing 91. This can simplify the structure of the housing 80, thereby reducing the manufacturing cost for the housing 80.

Figure 8:
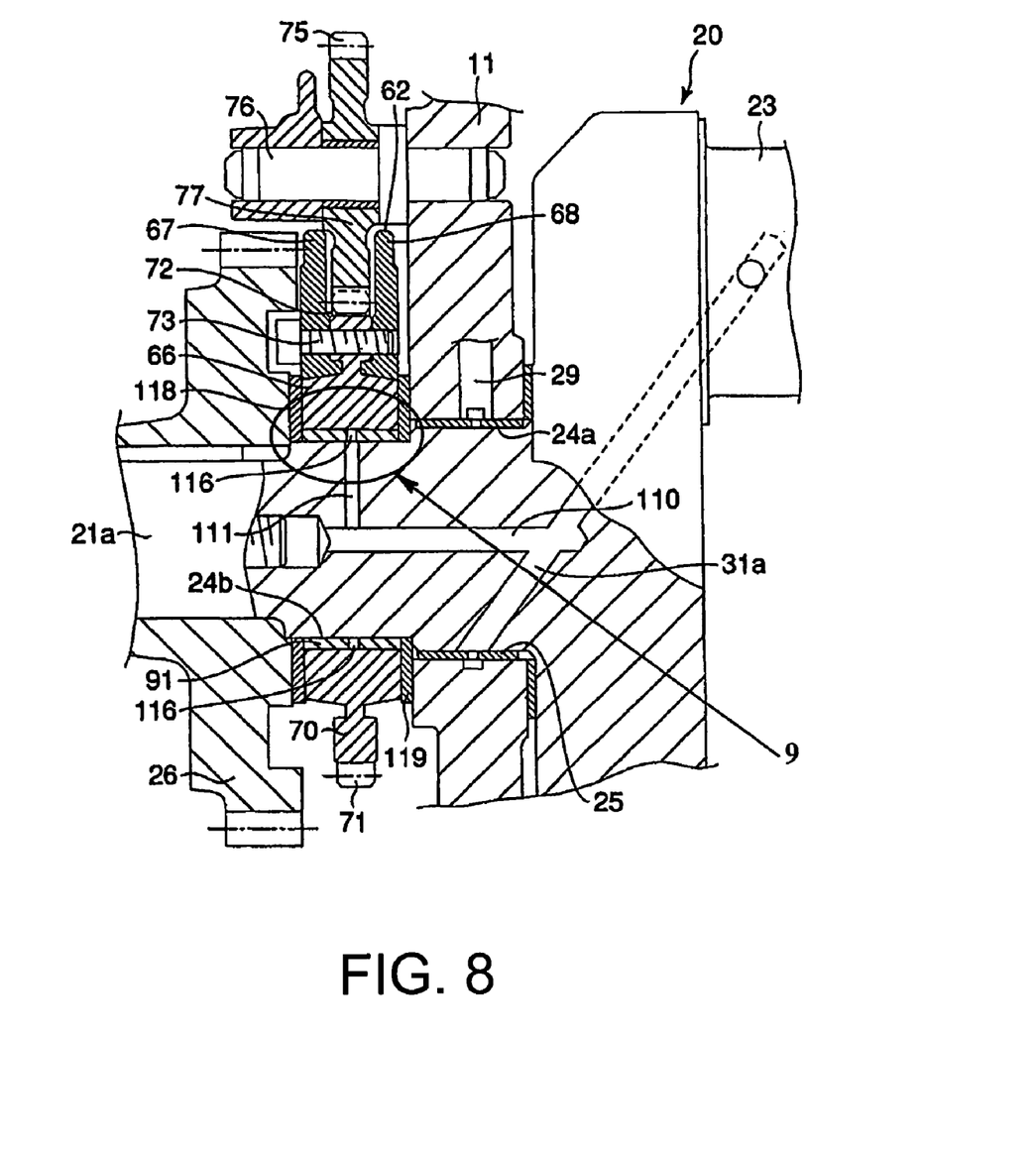
FIG. 8 is a cross-sectional view showing the positional relationship among the second balance weight, the slide bearing, and the crankshaft, and the lubricating-oil route to the slide bearing according to a third embodiment of the invention.
Figure 9:
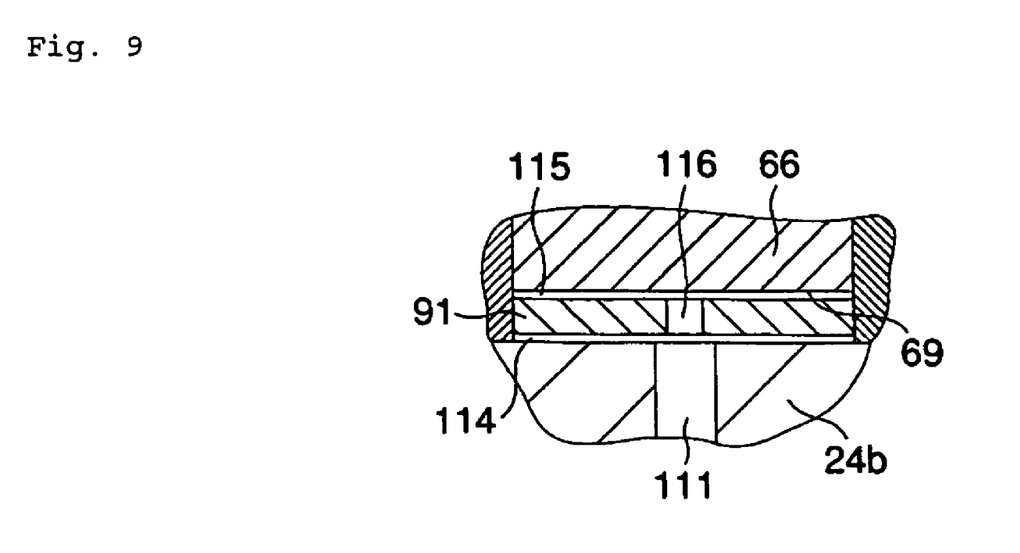
FIG. 9 is an enlarged cross-sectional view showing the part of the slide bearing which supports the second balance weight according to the third embodiment of the invention.

FIGS. 8 and 9 disclose a third embodiment of the invention. The difference between the third embodiment and the second embodiment is the structure for rotatably supporting the second balance weight 62. The other structure is the same as that of the second embodiment. Accordingly, the components of the third embodiment the same as those of the second components are given the same reference numerals and their description will be omitted.

As shown in FIG. 8, the second portion 24b of the shaft 21a passes through the boss 66 of the second balance weight 62 coaxially. The slide bearing 91 is interposed between the outer circumference of the second portion 24b and the inner circumference of the bearing hole 69 of the boss 66. The slide bearing 91 is fitted to the outer circumference of the second portion 24b and the inner circumference of the bearing hole 69 with clearance therebetween, respectively.

Accordingly, as shown in FIG. 9, the slide bearing 91 defines a clearance 114 between it and the outer circumference of the second portion 24b and defines a clearance 115 between it and the inner circumference of the bearing hole 69. The first and second clearances 114 and 115 continue along the circumference of the slide bearing 91.

The oil passage 111 of the crankshaft 20 is open to the first clearance 114. The slide bearing 91 has a plurality of oil ports 116. The oil ports 116 are aligned at intervals along the circumference of the slide bearing 91 and pass through the thickness of the slide bearing 91. Accordingly, the first clearance 114 and the second clearance 115 are communicated with each other through the oil ports 116. The oil ports 116 are located on the rotation path drawn by the opening end of the oil passage 111 when the crankshaft 20 rotates.

A first washer 118 is disposed between the boss 66 of the second balance weight 62 and the reduction pinion 26. Similarly, a second washer 119 is disposed between the boss 66 of the second balance weight 62 and the support wall 11 of the left case 8a. The reduction pinion 26 clamps the first washer 118, the second washer 119, and the boss 66 between it and the support wall 11 when fixed to the shaft 21a of the crankshaft 20.

The second balance weight 62 is positioned to the axis of the crankshaft 20, and the clearance between the reduction pinion 26 and the second balance weight 62 and the clearance between the support wall 11 and the second balance weight 62 are controlled.

With such a structure, the lubricating oil that has lubricated the bearing portion of the crankshaft 20 flows from the delivery passage 31a into the feed passage 110. The lubricating oil then flows into the first clearance 114 between the second portion 24b of the shaft 21a and the slide bearing 91 through the oil passage 111 to form an oil film between the second portion 24b and the slide bearing 91.

The lubricating oil introduced into the first clearance 114 flows into the second clearance 115 between the slide bearing 91 and the second balance weight 62 through the oil ports 116 of the slide bearing 91 to form an oil film between the slide bearing 91 and the second balance weight 62. As a result, the slide bearing 91 floats between the shaft 21a and the second balance weight 62, thereby allowing the relative rotation of the slide bearing 91 separately from the shaft 21a and the second balance weight 62.

According to the third embodiment of the invention, the slide bearing 91 located between the crankshaft 20 and the second balance weight 62 is separated from both of the crankshaft 20 and the second balance weight 62 via the oil film interposed between the first and second clearances 114 and 115.

In other words, when the rotation speed (a first speed) of one of the crankshaft 20 and the second balance weight 62 is expressed as a positive value, and the other (a second speed) is expressed as a negative value, the slide bearing 91 has a rotation speed higher than the second speed and lower than the first speed.

Accordingly, the relative velocity between the slide bearing 91 and the crankshaft 20 and that between the slide bearing 91 and the second balance weight 62 can be reduced although the crankshaft 20 and the second balance weight 62 rotate in the opposite direction from each other. This reduces the load on the slide bearing 91 to increase the life thereof and to prevent extraordinary wear that may cause, for example, seizing. Thus, the reliability of the bearing portion that supports the second balance weight 62 is improved.

With such a structure, it is sufficient to dispose the slide bearing 91 between the crankshaft 20 and the second balance weight 62. The structure of the bearing portion of the second balance weight 62 can therefore be simplified.

It should be understood that the invention is not limited to the foregoing embodiments, but various modifications may be made therein without departing from the spirit and scope of the invention.

For example, the boss of the second balance weight and the first and second weights may not necessarily be separate components but may be integrated to one piece.

The rotation shaft may not necessarily be the crankshaft. The rotating member that rotates in the direction opposite to that of the rotation shaft may not necessarily be the balance weight but may be another component such as a gear.

The bearing member is not limited to the slide bearing but may be a ball bearing.

The invention claimed is:

1. A bearing system comprising:
a case;
a rotation shaft supported by the case;
a rotating member disposed coaxially outside the rotation shaft and rotating in the direction opposite to that of the rotation shaft;
a housing fixed to the case and interposed between the rotation shaft and the rotating member; and
a bearing member interposed between the housing and the rotating member and rotatably supporting the rotating member;
wherein the case has a support wall that supports the rotation shaft rotatably, and the housing has a flange extending outward along the radius of the rotation shaft, the outer periphery of the flange being fixed to the support wall via a plurality of fastening members.

2. The bearing system according to claim 1, wherein the outer periphery of the flange is the thickest of the flange.

3. The bearing system according to claim 2, wherein the flange of the housing and the support wall are fixed to each other via positioning means for positioning the housing and the rotation shaft coaxially.

4. The bearing system according to claim 1, wherein the flange of the housing and the support wall are fixed to each other via positioning means for positioning the housing and the rotation shaft coaxially.

5. The bearing system according to claim 1, wherein the bearing member is a slide bearing, the slide bearing being press-fitted into the rotating member and fitted in the housing with clearance therebetween, and wherein lubricating oil is supplied between the slide bearing and the housing.

6. The bearing system according to claim 5, wherein the housing has an oil passage for feeding the lubricating oil to the slide bearing, and one of the case and the rotation shaft has a feed passage for feeding the lubricating oil to the oil passage.

7. A balancer comprising:
a crankcase;
a crankshaft housed in the crankcase and having a shaft;
a balance weight having a boss through which the shaft passes coaxially and rotating in the direction opposite to that of the crankshaft;
a housing fixed to the crankcase and interposed between the shaft of the crankshaft and the boss of the balance weight; and
a bearing member interposed between the housing and the boss and supporting the boss rotatably;
wherein the crankcase has a support wall that supports the shaft of the crankshaft rotatably, and the housing has a flange extending outward along the radius of the shaft, the outer periphery of the flange being fixed to the support wall via a plurality of fastening members.

8. The balancer according to claim 7, wherein the bearing member is a slide bearing, the slide bearing being press-fitted into the boss and fitted in the housing with clearance therebetween, and wherein lubricating oil is supplied between the slide bearing and the housing.

9. The balancer according to claim 8, wherein the housing has an oil passage for feeding the lubricating oil to the slide bearing, and one of the crankcase and the crankshaft has a feed passage for feeding the lubricating oil to the oil passage.

10. The balancer according to claim 7, wherein the flange of the housing and the support wall are fixed to each other via positioning means for positioning the boss of the housing and the shaft of the crankshaft coaxially.

11. The balancer according to claim 7, wherein the balance weight includes a first weight and a second weight, the first and second weights being disposed in symmetry with the axial center of the boss therebetween.

12. The balancer according to claim 11, wherein the boss of the balance weight includes a gear for transmitting power, the gear being located between the first weight and the second weight.

* * * * *